(12) United States Patent
Aggarwal et al.

(10) Patent No.: US 10,498,685 B2
(45) Date of Patent: Dec. 3, 2019

(54) SYSTEMS, METHODS, AND APPARATUS FOR CONTROLLING PROVISIONING OF NOTIFICATIONS BASED ON SOURCES OF THE NOTIFICATIONS

(71) Applicant: Google LLC, Mountain View, CA (US)

(72) Inventors: Vikram Aggarwal, Palo Alto, CA (US); Moises Morgenstern Gali, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 149 days.

(21) Appl. No.: 15/818,323

(22) Filed: Nov. 20, 2017

(65) Prior Publication Data
US 2019/0158447 A1 May 23, 2019

(51) Int. Cl.
*H04L 12/58* (2006.01)
*G01C 21/36* (2006.01)
(Continued)

(52) U.S. Cl.
CPC .......... *H04L 51/24* (2013.01); *G01C 21/3608* (2013.01); *G01C 21/3626* (2013.01);
(Continued)

(58) Field of Classification Search
CPC ............ G01C 21/3608; G01C 21/3626; G01C 21/3415; G01C 21/3469; G01C 21/3617; G01C 21/3655; G01C 21/3667; G01C 21/3682; H04L 41/0813; H04L 51/24; H04L 67/26; H04L 67/306; H04L 12/1895; H04L 51/14; H04L 51/32; H04L 51/38;
(Continued)

(56) References Cited

U.S. PATENT DOCUMENTS 8,738,723 B1 5/2014 Faaborg et al.
8,938,394 B1 * 1/2015 Faaborg .................. G06F 3/167
704/270

(Continued)

OTHER PUBLICATIONS

European Patent Office; International Search Report and Written Opinion of PCT Ser. No. PCT/US2018/061318; 14pages; dated Jan. 25, 2019.

*Primary Examiner* — Greg C Bengzon
(74) *Attorney, Agent, or Firm* — Middleton Reutlinger

(57) ABSTRACT

Methods, apparatus, systems, and computer-readable media are provided for minimizing distractions caused by notifications. Notifications can be limited by scoring sources of notifications according to an activity that a recipient is involved in, previous interactions between a user and the source, and/or any other data that can be associated with a notification. For example, a user that is driving can limit the sources from which notifications can be received, unless a score for a particular sources satisfies a notification threshold while driving. Otherwise, if the score fails to satisfy the notification threshold, the user can be presented with the notification at a different time or via a modality that is less distracting than a typical modality for presenting the notification. As a user indicates preferences for receiving notifications from particular sources, the scores for those sources can be dynamically adapted to a user's predilection for particular sources and/or notifications.

18 Claims, 6 Drawing Sheets

(51) Int. Cl.
 *H04L 12/24* (2006.01)
 *H04W 8/18* (2009.01)
 *H04W 4/30* (2018.01)
(52) U.S. Cl.
 CPC ........... *H04L 41/0813* (2013.01); *H04W 4/30* (2018.02); *H04W 8/18* (2013.01)
(58) Field of Classification Search
 CPC ....... H04L 67/02; H04L 67/22; H04L 9/3247; H04W 4/30; H04W 4151/24; H04W 4/50; H04W 12/08; H04W 48/04; H04W 4/027; H04W 4/046; H04W 4/06; H04W 4/12; H04W 4/40; H04W 4/42; H04W 4/48; H04W 68/005; H04W 8/18; G06N 20/00; B60W 2040/0809; B60W 2040/0872; B60W 2540/22; B60W 2550/12; B60W 2550/14; B60W 2710/1044; B60W 2710/18; B60W 2720/10; B60W 30/143; B60W 40/08; B60W 40/09; G06Q 10/107; G06Q 20/102; G06Q 2240/00; G06Q 30/0283; G06Q 40/08; G06Q 50/01; G06Q 50/30; G08G 1/0112; G08G 1/012; G08G 1/0129; G08G 1/0141; G08G 1/0145; G08G 1/065; G08G 1/07; G08G 1/093; G08G 1/0962; G08G 1/0965; G08G 1/0967; G08G 1/096725; G08G 1/096741; G08G 1/096775; G08G 1/096791; G08G 1/096811; G08G 1/096822; G08G 1/096838; G08G 1/097; H04B 1/3822; H04B 7/18504; H04M 15/60; H04M 1/6075; H04M 1/72572; H04M 1/72577
 See application file for complete search history.

(56) References Cited

U.S. PATENT DOCUMENTS

| | | | | |
|---|---|---|---|---|
| 8,943,126 B1* | 1/2015 | Feldman | H04L 67/26 | 709/203 |
| 9,037,455 B1* | 5/2015 | Faaborg | G10L 21/00 | 704/208 |
| 9,104,537 B1* | 8/2015 | Penilla | G06F 17/00 | |
| 9,229,905 B1* | 1/2016 | Penilla | G06F 17/00 | |
| 9,288,270 B1* | 3/2016 | Penilla | H04W 4/046 | |
| 9,467,515 B1* | 10/2016 | Penilla | G06Q 20/18 | |
| 9,730,181 B1* | 8/2017 | Matsumoto | H04B 1/3833 | |
| 9,754,425 B1* | 9/2017 | Iqbal | G07C 5/008 | |
| 2008/0119169 A1* | 5/2008 | Rao | H04W 4/18 | 455/412.1 |
| 2008/0133230 A1* | 6/2008 | Herforth | G01C 21/26 | 704/235 |
| 2010/0216509 A1* | 8/2010 | Riemer | H04M 1/72577 | 455/557 |
| 2012/0050028 A1* | 3/2012 | Mastronardi | B60K 37/00 | 340/441 |
| 2012/0149342 A1 | 6/2012 | Cohen et al. | | |
| 2012/0282906 A1* | 11/2012 | Frye | H04W 4/04 | 455/414.2 |
| 2012/0282908 A1* | 11/2012 | Nicolini | H04W 4/04 | 455/418 |
| 2013/0086518 A1* | 4/2013 | Park | H04L 67/12 | 715/808 |
| 2013/0143527 A1* | 6/2013 | Randazzo | H04W 48/04 | 455/411 |
| 2013/0150004 A1* | 6/2013 | Rosen | H04W 8/22 | 455/414.1 |
| 2013/0275899 A1* | 10/2013 | Schubert | G06F 3/0481 | 715/765 |
| 2014/0082094 A1* | 3/2014 | Bilgen | G06Q 50/01 | 709/206 |
| 2014/0113619 A1* | 4/2014 | Tibbitts | G07C 5/008 | 455/419 |
| 2014/0123157 A1* | 5/2014 | Keskitalo | G06Q 10/107 | 719/328 |
| 2014/0206328 A1 | 7/2014 | Varoglu et al. | | |
| 2014/0227991 A1* | 8/2014 | Breton | G08B 25/006 | 455/404.2 |
| 2014/0277843 A1* | 9/2014 | Langlois | H04M 1/6091 | 701/2 |
| 2014/0277932 A1* | 9/2014 | Prakah-Asante | B60K 28/02 | 701/36 |
| 2014/0295803 A1* | 10/2014 | Kobayashi | G06Q 10/107 | 455/412.2 |
| 2015/0046828 A1* | 2/2015 | Desai | G06F 1/163 | 715/739 |
| 2015/0074554 A1* | 3/2015 | Sasaki | G06F 3/0481 | 715/753 |
| 2015/0191122 A1* | 7/2015 | Roy | G08G 1/0962 | 340/439 |
| 2015/0244805 A1* | 8/2015 | Hampiholi | G06F 16/9535 | 709/217 |
| 2015/0244854 A1* | 8/2015 | Babel | H04M 1/66 | 455/414.1 |
| 2015/0271290 A1* | 9/2015 | Tao | H04L 41/5051 | 709/217 |
| 2015/0276421 A1* | 10/2015 | Beaurepaire | H04W 4/027 | 701/400 |
| 2015/0367770 A1* | 12/2015 | Newton-Dunn | B60Q 1/00 | 340/438 |
| 2016/0080223 A1* | 3/2016 | Shubs, Jr. | H04L 41/0609 | 709/224 |
| 2016/0165031 A1* | 6/2016 | Gopinath | H04M 1/6091 | 455/569.2 |
| 2016/0173700 A1* | 6/2016 | O'Connor | H04M 15/60 | 455/405 |
| 2016/0182707 A1* | 6/2016 | Gabel | H04W 4/90 | 455/404.2 |
| 2016/0205246 A1* | 7/2016 | Sim | H04L 67/125 | 455/419 |
| 2016/0214535 A1* | 7/2016 | Penilla | G06Q 20/18 | |
| 2016/0248865 A1* | 8/2016 | Dotan-Cohen | H04L 67/26 | |
| 2016/0249319 A1* | 8/2016 | Dotan-Cohen | H04M 3/42365 | |
| 2016/0371895 A1* | 12/2016 | Jayanthi | G07C 5/008 | |
| 2017/0017351 A1* | 1/2017 | Singh | G06Q 10/10 | |
| 2017/0028913 A1* | 2/2017 | Bijlani | B60Q 9/00 | |
| 2017/0072850 A1* | 3/2017 | Curtis | B60W 50/0097 | |
| 2017/0075740 A1* | 3/2017 | Breaux | G06F 9/546 | |
| 2017/0078465 A1* | 3/2017 | Ito | B60K 35/00 | |
| 2017/0084175 A1* | 3/2017 | Sedlik | G08G 1/0112 | |
| 2017/0101054 A1* | 4/2017 | Dusane | G08G 1/127 | |
| 2017/0146348 A1* | 5/2017 | Vandanapu | G01C 21/20 | |
| 2017/0180499 A1* | 6/2017 | Gelfenbeyn | H04L 51/02 | |
| 2017/0193627 A1* | 7/2017 | Urmson | G01C 21/3617 | |
| 2017/0201619 A1* | 7/2017 | Cohen | H04M 1/6075 | |
| 2017/0219369 A1* | 8/2017 | Lei | G01C 21/34 | |
| 2017/0265044 A1* | 9/2017 | Lundsgaard | H04W 4/046 | |
| 2017/0279957 A1* | 9/2017 | Abramson et al. | H04M 1/72577 | |
| 2017/0302609 A1* | 10/2017 | Vardhan | H04L 51/24 | |
| 2017/0316533 A1* | 11/2017 | Goldman-Shenhar | G06Q 50/30 | |
| 2017/0324684 A1* | 11/2017 | Dharmapalan | H04L 51/04 | |
| 2017/0332347 A1* | 11/2017 | Boss | H04W 24/08 | |
| 2017/0359798 A1* | 12/2017 | Bradley | H04L 51/24 | |
| 2017/0364823 A1* | 12/2017 | Ilic | H04L 51/24 | |
| 2018/0059913 A1* | 3/2018 | Penilla | B60N 2/0228 | |
| 2018/0091085 A1* | 3/2018 | Tamagaki | B60K 28/06 | |
| 2018/0111552 A1* | 4/2018 | Neiswander | B60R 37/06 | |
| 2018/0174446 A1* | 6/2018 | Wang | G08G 1/0112 | |
| 2018/0264943 A1* | 9/2018 | Akachi | H04M 19/04 | |
| 2018/0273050 A1* | 9/2018 | Tertoolen | B60R 1/00 | |
| 2018/0299284 A1* | 10/2018 | Wang | G08G 1/0141 | |
| 2018/0348723 A1* | 12/2018 | Brew | G06F 17/2715 | |

(56) References Cited

U.S. PATENT DOCUMENTS

2019/0182749 A1\* 6/2019 Breaux ................ H04W 48/04
2019/0190980 A1\* 6/2019 Penilla .................... G06F 17/00

\* cited by examiner

SYSTEMS, METHODS, AND APPARATUS FOR CONTROLLING PROVISIONING OF NOTIFICATIONS BASED ON SOURCES OF THE NOTIFICATIONS

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using (i) spoken natural language input (i.e. utterances), which may in some cases be converted into text and then processed, and/or (ii) by providing textual (e.g., typed) natural language input. When the user is participating in an activity such as driving, the user may not be available to give the automated assistant much attention because of the amount of cognition needed by the user to navigate a vehicle. As a result, the automated assistant may provide various notifications to the user, only for the user to subsequently not remember what notifications were provided. Furthermore, if the user is participating in a group chat or subscribes to various services, the number of incoming messages to the user can be overwhelming and lead to dangerous consequences, should the user become too distracted while driving. If provisioning of notifications is overall ineffective for eliciting responses from the user, computational resources may subsequently be wasted on repeating the notifications to the user. Furthermore, indiscriminately repeating notifications can be a waste of time for a user who may have acknowledged some notifications despite participating in some other activity.

SUMMARY

Implementations described herein relate to systems, methods, and apparatus for dynamically determining whether, when, and/or how to present various electronic notifications to a user, based at least in part on sources of those notifications. Dynamically adapting the provisioning of notifications to a user can reduce distractions caused by certain notifications (e.g., by suppressing their provision and/or providing them through a less distracting modality) and/or can reduce consumption of various computational resources associated with providing the certain notifications. For example, computational resources can be reduced through reduction in quantities and/or extents of provided notifications, and/or through suppressing immediate provision of certain notifications and instead providing them at a later time when a user is less distracted (thereby mitigating occurrences of providing notifications to the user both: when the user is distracted, and again at the later time).

In various implementations, distractions associated with received notifications can be mitigated using data related to identities of sources of the notifications and/or contextual data associated with the notifications. For example, whether and/or how notifications are provided to a user can be based on scores of sources that are associated with a source of the notifications. A score for a source can be particularized to the user, and can be based on past computer-based interactions of the user with the source, current contextual data associated with the user, contextual data associated with the source, explicit user interface input from the user, and/or other data. A "source", as used herein, can refer to a person (e.g., "Bob"), an application (e.g., "Messaging App 1"), or a combination of applications, such as media applications, messaging applications, navigations applications, and/or other application(s). Notifications initialized by applications can be addressed (e.g., provided or suppressed) according to an importance of the notifications to the user and/or to an activity in which the user is participating (e.g., driving a vehicle). In some implementations, sources of notifications can be ranked by the automated assistant according to how the user typically interacts with the source and/or their notifications, and/or any other contextual data (e.g., calendar data, location data, etc.) associated with the source and/or the user. Furthermore, the rankings can be adapted over time in order to continue modifying the provisioning of notifications received by the user from the source.

Techniques related to selectively suppressing and/or otherwise adapting provisioning of inbound notifications according to sources of the notifications and/or contextual data are implemented by one or more computing devices. For example, the user can operate a vehicle that includes a vehicle computing device, and the vehicle computing device can be paired (e.g., via Bluetooth, a "wired" connection, and/or other communication protocol(s)) to a portable computing device that includes a variety of applications. The applications can communicate over a network (e.g., LTE, Wi-Fi, Bluetooth or any other network connection) with remote server device(s), in order to receive data from the remote server device(s). The adapting of the provisioning of inbound notifications can be performed at the portable computing device, remote server device(s), and/or the vehicle computing device. For example, the portable computing device and/or the vehicle computing device can perform all or aspects of the processing involved with selectively suppressing provision of notifications to the user, enabling such processing to be performed even when the remote server device is not available (e.g., because of a network outage).

In some implementations, the portable computing device can initially filter notifications according to properties of the notifications, and then transmits all or aspects of the remaining notifications to a remote server device. In these and other manners, only those notifications that satisfy the portable computing device's initial filtering are transmitted to the remote server device, thereby mitigating consumption of network resources. The remote server device can then process each of the remaining notifications and determine a score for each of the remaining notifications. The scores can be based on contents of the notifications (e.g., natural language content), contents of messages corresponding to the notifications, contextual data associated with the notifications, behavioral data associated with the user, and/or any other data that can be used to score a relevance or importance of a notification. In some versions of those implementations, the remote server device provides the scores to the portable computing device and, when the portable computing device receives the scores, the portable computing device can compare the scores to one or more thresholds in order to determine how and/or when to present the notifications to the user. For example, a score provided for a first notification can satisfy a partial notification threshold and thereby cause the portable computing device to present the notification as a graphic on a display device. Continuing with the example, a score provided for a second notification can satisfy a complete notification threshold and thereby cause the portable computing device to present the notification through an audible modality along with a query regarding whether the user would like to respond to the query. Still continuing with the example, a score provided for a third notification can fail to satisfy any notification threshold, thereby causing the portable computing device to suppress immediate provision of any content related to the third notification. In some additional and/or alternative versions of those implementations, the remote server device determines, based on the score, whether and/or how notifications are to be provided, and provides, to the portable computing device, indications of whether and/or how the notifications are to be provided (e.g., in lieu of the scores). The portable computing device can then use the indications of whether and/or how the notifications are to be provided, in determining whether and/or how to present the notifications.

In some implementations, notifications can be limited using hashes that allow an automated assistant to identify an application that is associated with the notification. The automated assistant can be executing at least in part on the portable computing device and/or in communication with the portable computing device. Using hashes to identify an application that is associated with the notification can allow the automated assistant to address provisioning of the notification based on the application associated with the notification. For example, the automated assistant can enable immediate provisioning of notifications with a hash that corresponds to a messaging application while suppressing immediate provision of notifications that correspond to certain other notifications (e.g., notifications regarding sales, game applications, airfares, etc.). In some implementations, an inbound notification can be included in a data packet that includes a string of data that is based on a name of the application that originated the inbound notification. The string of data can be compared to a table of hashes in order to determine the application that the inbound notification corresponds to and/or the score or priority of the application.

When an inbound notification, corresponding to a messaging application, is received at the portable computing device or vehicle computing device, the automated assistant can cause further processing to be performed on the inbound message or inbound notification. For example, contents of the message (e.g., title, subject, body, recipients, sender, etc.), combined with other contextual data (e.g., location of the user, a location of the source, calendar data, relationship of the source to the user, related notifications, and/or any other data) can be used to determine whether to notify the user of the message or limit the notification in some way. In some implementations, the notification can be limited based on whether the user is driving, or whether the user has explicitly indicated that they do not want to be disturbed while driving. For example, the automated assistant can be accessible through the vehicle computing device and the vehicle computing device can include an audio interface capable of receiving voice commands from the user. When the automated assistant begins to indicate that a notification has been received (e.g., "You have received a message from Karen. Would you like . . . "), the user can interrupt the automated assistant and indicate that they would not like to be disturbed (e.g., "Please don't disturb me right now."). In response, the automated assistant can gather contextual data about the response provided by the user in order to limit similar notifications that would otherwise be provided under similar circumstances.

Additionally or alternatively, the automated assistant can use a scoring of sources in order to query the user regarding whether to limit notifications from the sources. For instance, if multiple notifications are being received from relatively low scoring applications (e.g., a shopping application that the user accesses infrequently, such as once a week), the automated assistant can query the user regarding whether the user would like to receive those notifications at the time of receipt (e.g., while driving). If the user indicates that they would not like to receive the notifications, the scoring of the sources can be further reduced based on the response of the user and any contextual data (e.g., vehicle-related data) gathered at the time receipt.

Source scoring can be performed by one or more processes. In some implementations, source scoring can be performed by a contextual scoring engine and a score adjustment engine. The contextual scoring engine can use contextual data in order to score a source of the data that is being used by the automated assistant as a basis for a notification. The contextual scoring engine can operate at one or more of the vehicle computing device, the portable computing device, and/or the remote server device. For example, the automated assistant can be operating at least at the remote server device, and the contextual scoring engine can be operating at the portable computing device. As the portable computing device receives notifications from the automated assistant, the contextual scoring engine can limit the notifications that will be provided to the user according to how the contextual scoring engine is scoring the sources. Source scoring can be established and/or adjusted at the contextual scoring engine using contextual data and/or user behavior data that is available to the portable computing device. For instance, a source that is specified as being a spouse of the user, at least according to a list of contacts stored at the portable computing device, can be scored higher than most other contacts in the list of contacts. In this way, distractions can be mitigated according to data that has been explicitly provided by the user, as well as any other contextual data and/or behavioral data collected by the automated assistant.

Source scoring can be further adapted by a score adjustment engine, which can operate in combination with the contextual scoring engine. The score adjustment engine can update scores of sources (e.g., persons and/or applications) according to learned behaviors of the user, as observed by the automated assistant and/or any other device with which the user interacts. Such learned behaviors can be based on how the user responds to a source, whether a user chooses to receive a notification from a source, previous interactions between the user and the source, and/or any other actions that can be associated with the user and/or the source. For example, a user may have asked the automated assistant to call a particular contact (i.e., a source) while driving their vehicle. Therefore, the score adjustment engine can increase a score of the particular contact based on the willingness of the user to participate in a phone call with the particular contact while operating the vehicle during the phone call.

In some implementations, the automated assistant can explicitly ask the user about the importance of a particular source in order that the automated assistant can cause a scoring of the particular source to be adjusted accordingly. For example, the first time a message is received from a particular source during an activity (e.g., driving), the automated assistant can query the user regarding whether they would like to know the contents of the message (e.g., "You received a message from Nancy. Would you like to hear the message?"). If the user responds positively (e.g., "Sure"), the scoring of the particular source can be set above a particular notification threshold for receiving notifications from the source during the activity. If the user responds negatively (e.g., "Not right now"), the scoring of the particular source can be set below the particular notification threshold so that, in the future, the user will not be distracted with messages from the source until the score of the source increases above the threshold.

A scoring of a source can be modified to exceed a particular threshold, despite the scoring initially being set below the particular threshold. For example, if the user receives a notification regarding an incoming message from a new contact while the user is driving their vehicle, and the user declines to receive the content of the message, the score of the new contact can be set below a notification threshold. Thereafter, if the user adds an event in their calendar, and the new contact is identified as an attendee of the event, the score of the new contact can be increased by the score adjustment engine. Eventually, if the score of new contact reaches or exceeds the notification threshold, notifications regarding messages from the new contact can be received while the user is participating in an activity (e.g., driving), at least until the user again indicates their aversion to receiving such notifications while participating in the activity.

In some implementations, scoring of a source can be based on an interaction(s) between the source and the user immediately before the user is engaged in an activity. For example, a source and a user can participate in a conversation via a messaging application, and, before the conversation is over, the user can decide to subsequently enter their vehicle and drive to a location. If, during the drive, the vehicle computing device, or a portable computing device carried by the user, receives a notification indicating that a message was received from the source, a score of the source can be adjusted based on recent contextual data. The recent contextual data can identify a time of the most recent conversation between the user and the source, and therefore indicate that the conversation was immediately before the user started driving. If the increase in score of the source causes their score to be above the notification threshold, the user can receive the notification or the message during their drive. However, if the increase in score does not cause the score to increase above the notification threshold, the user can be notified about the message after the user has completed their drive or at some other time when the user is less engaged in an activity.

Limitations on provisioning of notifications can be based on one or more notification thresholds, such as a complete notification threshold and/or a partial notification threshold. As notifications are provided to a computing device (e.g., a vehicle computing device and/or a portable computing device), a score of each source associated with a notification can be compared to each threshold in order to determine how a notification should be presented to the user. For example, a contextual scoring engine can initially establish a score of a source to be below both the complete notification threshold and the partial notification threshold. As a result, notifications associated with the source would not be provided to the user while the user is driving or engaged in a particular activity. If the score of the source increases past the partial notification threshold, as a result of explicit instructions from the user and/or from other data being collected by the automated assistant, at least a portion of the notification, or a message associated with the notification, can be presented to the user while the user is engaged in an activity. If the score of the source further increases past the complete notification threshold, the entire notification, or message associated with the notification, can be presented to the user while the user is engaged in the activity.

In some implementations, a method implemented by one or more processors is set forth as including operations such as receiving, at a first computing device, notifications from a remote server device that is accessible to applications from which the notifications are based. The operations can further include identifying a first source of a first notification of the notifications and a second source of a second notification of the notifications. The first source can correspond to a first entity that controls a first application of the applications and the second source can corresponds to a second entity that controls a second application of the applications. The operations can also include determining that a first score for the first source satisfies a notification threshold and a second score for the second source fails to satisfy the notification threshold. The first score can be based on first previous instances of interaction between a user of the first computing device and the first source. The second score can be based on second previous instances of interaction between the user and the second source. The operations can also include receiving, from a second computing device, contextual data that is based on one or more properties of an activity in which the second computing device is participating. The second computing device can be configured to provide certain notifications according to scores of sources associated with the notifications. Furthermore, the operations can include modifying the second score based on the contextual data, determining that the modified second score satisfies the notification threshold, and causing the second computing device to provide the first notification and the second notification based on the first score and the modified second score satisfying the notification threshold.

The second computing device can be a vehicle computing device that is integrated in a vehicle and that is paired with the first computing device. The activity can be navigating a vehicle that includes the vehicle computing device. The one or more properties on which the contextual data can be based identify how the vehicle is navigating. Navigating the vehicle can include navigating the vehicle through a route that is dictated at an audio interface of the vehicle computing device, and the vehicle computing device can include a navigation application corresponding to a third score that satisfies the notification threshold. Modifying the second score based on the activity can further cause the second score to temporarily satisfy the notification threshold until the second computing device ceases participating in the activity. The notification threshold can be associated with a particular modality through which the first notification and the second notification are provided. The particular modality can include one or both of: an audio modality and a visual modality.

In other implementations, a method implemented by one or more processors is set forth as including steps of receiving, at a client computing device of a user during performance of an activity by the user, a notification, and identifying, at the client computing device, a source of the notification. The operations can also include determining, at the client computing device and based on the source of the notification, that the notification is a candidate for providing to the user during the performance of the activity. The operations can further include, in response to determining that the notification is a candidate for providing to the user during the performance of the activity: transmitting, by the client computing device to a remote server device, notification data that is based on the notification; receiving, from the remote server device in response to the transmitting, provisioning data that indicates whether to provide the notification; and causing, by the client computing device and based on the provisioning data, notification content, that is based on the notification, to be provided to the user during the activity. Causing the notification content to be provided can include causing the notification content to be provided via at least one of: the client computing device and an additional computing device paired with the client device. In some implementations, the operations can include receiving, at the client computing device during performance of the activity, an additional notification, and identifying, at the client computing device, an additional source of the additional notification. The operations can also include determining, at the client computing device and based on the additional source of the additional notification, that the additional notification is not a candidate for providing to the user during the activity. The operations can also include, based on determining that the notification is not a candidate for providing to the user: suppressing transmission of additional notification data to the remote server, wherein the additional notification data is based on the additional notification; and suppressing provision of the additional notification during the activity. Transmitting the notification data to the remote server device can be further based on determining, at the client device, that the user is engaged in the activity.

The provisioning data received from the remote server device in response to the transmitting can further indicate a particular modality via which to provide the notification. Causing the notification content to be provided can include: causing the notification content to be provided via the particular modality based on the provisioning data indicating the particular modality. The particular modality can be one of: an audio only modality, a graphical only modality, and a combined audio and graphical modality. The particular modality can indicate whether the notification content is to be provided via the client computing device only, the additional computing device only, or both the client computing device and the additional computing device. The activity can be related to a vehicle, and the additional computing device can be integral with the vehicle. Furthermore, causing the notification content to be provided can include: controlling, by the client device, the additional computing device to cause the additional computing device to provide the notification content. The notification can be a message from a source and includes natural language content formulated by the source. Additionally, determining, at the client computing device, that the notification is a candidate for providing to the user can be based on the source of the notification and can be independent of the natural language content. The provisioning data can be determined at the remote server device based on the natural language content. The notification content can include a subset of the notification or a rewrite of the notification, and the provisioning data can be received from the remote server device further comprises the notification content. The provisioning data can include a score for the notification, and causing the notification data to be provided based on the provisioning data can include causing the notification data to be provided based on the score satisfying a threshold.

In yet other implementations, a method implemented by one or more processors is set forth as including operations such as receiving one or more pre-activity messages in a messaging session between participants. The participants can include a user and one or more additional users. Each of the participants can engage in the messaging session using a corresponding messaging application of a corresponding computing device. The pre-activity messages can be received prior to the user engaging in a particular activity. The operations can also include determining, after receiving the one or more pre-activity messages, that the user is engaged in the particular activity, and, in response to determining that the user is engaged in the particular activity: activating a modified notification mode that selectively suppresses provisioning of electronic notifications to the user. The operations can further include receiving, while the user is engaged in the particular activity and while the modified notification mode is activated, an additional message provided in the messaging session by one of the one or more additional users. The operations can also include determining a score for the additional message based on at least one of: recency of the one or more pre-activity messages, and a quantity of the one or more pre-activity messages. Additionally, the operations can include causing, based on the score, content that can be based on the additional message to be rendered via at least one computing device of the user.

Causing, based on the score, the content to be rendered via the at least one computing device can include determining, based on the score, to provide the content in lieu of suppressing the content. Causing, based on the score, the content to be rendered via the at least one computing device can include selecting the computing device, or a modality for rendering of the content, based on the score. The method can include receiving, while the user is engaged in the particular activity and while the modified notification mode is activated, an additional notification that is not part of the messaging session. The method can also include determining an additional score for the additional notification based on a source of the additional notification, and suppressing, based on the additional score, provision to the user of any additional content that is based on the additional notification. The score can also be generated using interaction data that identifies an instance when the user previously received a prior notification from the participant while formerly engaged in the activity. Causing, based on the score, the content that can be based on the additional message to be rendered via the at least one computing device of the user comprises causing the content to be audibly rendered. The method can further include receiving, while the user is engaged in the particular activity and while the modified notification mode is activated, an additional notification that is not part of the messaging session. Additionally, the method can include determining an additional score for the additional notification based on a source of the additional notification; and causing, based on the additional score, additional content that is based on the additional notification to be graphically rendered via the at least one computing device, without being simultaneously audibly rendered.

Various implementations disclosed herein may include one or more non-transitory computer readable storage media storing instructions executable by a processor (e.g., a central processing unit (CPU), graphics processing unit (GPU), and/or Tensor Processing Unit (TPU)) to perform a method such as one or more of the methods described herein. Yet other various implementations may include a system of one or more computers that include one or more processors operable to execute stored instructions to perform a method such as one or more of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
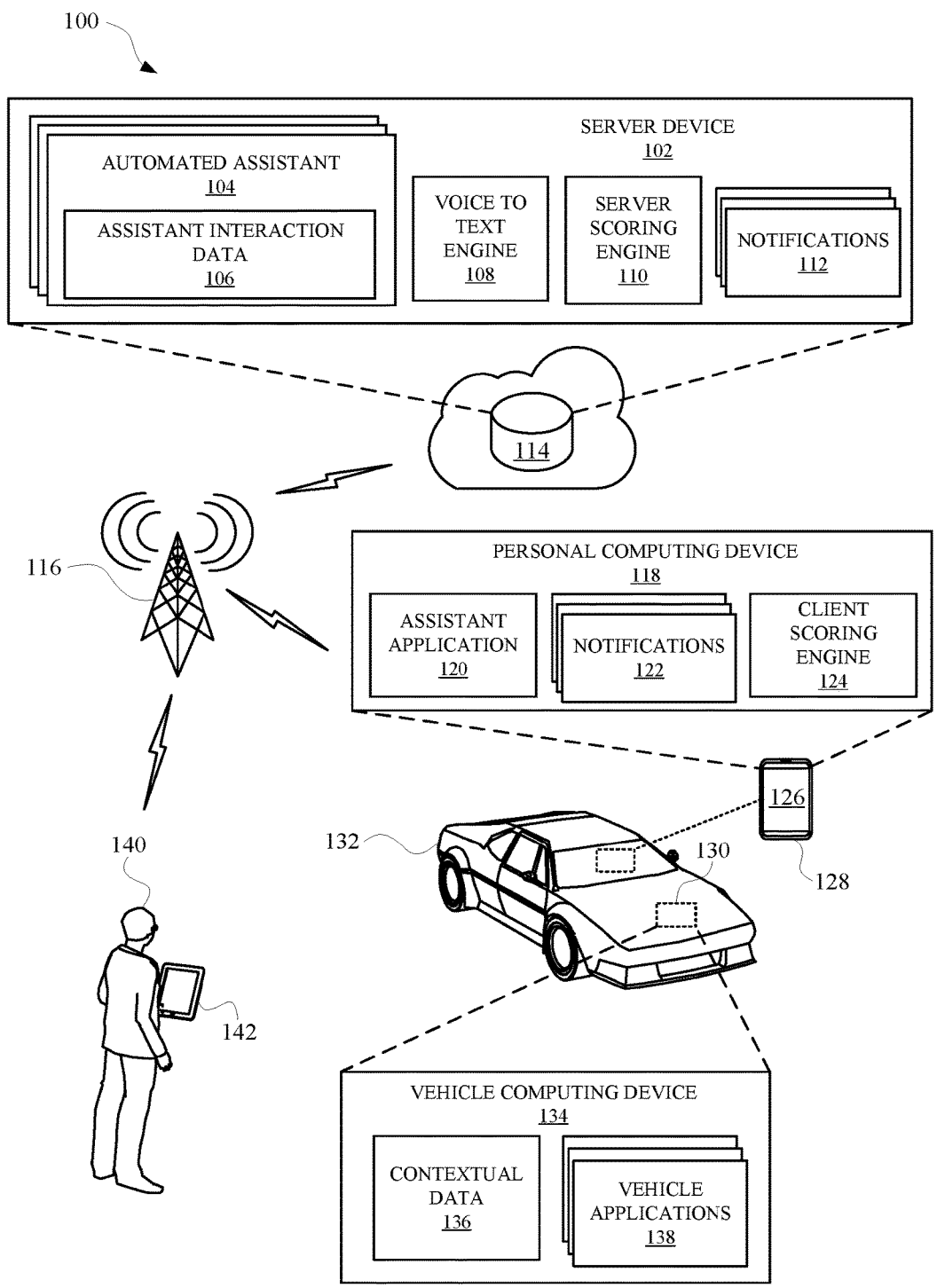
FIG. 1 illustrates a system for limiting notification provided to a user according to scores generated for the notifications and/or sources of the notifications.

FIG. 1 illustrates a system 100 for limiting notification provided to a user according to scores generated for the notifications and/or sources of the notifications. The system 100 can include a remote device 114, such as a server device 102, which can host an automated assistant 104. In some implementations, the automated assistant 104 can be hosted at the server device 102, and/or one or more computing devices capable of hosting an assistant application. For example, in some implementations, the automated assistant 104 can be hosted at a personal computing device 118, a vehicle computing device 134, and/or the remote device 114. Processes and/or functions performed by the automated assistant 104 can be performed by the server device 102, or distributed over separate devices. For instance, a user can provide an input, such as a voice command or a textual input, at an assistant interface of the personal computing device 118. The input from the user can be transmitted from the personal computing device 118, over a network 116, such as a private network (e.g., peer-to-peer), or a public network (e.g., the internet), to the server device 102. When the input is a voice command, or other audible input from the user, the input can be received at a voice to text engine 108, which can be part of the automated assistant 104 or separate from the automated assistant 104. The voice to text engine 108 can convert the input into text, which can be parsed by the automated assistant 104 to determine how the automated assistant 104 can sufficiently respond to the input from the user.

Interactions between one or more users and the automated assistant 104 can be stored as assistant interaction data 106. The assistant interaction data 106 can, for example, provide correspondence data that identifies one or more inputs received from the one or more users and one or more responses generated from the automated assistant 104. The automated assistant 104 can employ one or more machine learning algorithms for learning or otherwise adapting to user requests, preferences, and/or how the user otherwise interacts with the automated assistant 104. In some implementations, the server device 102 and/or the automated assistant 104 can include a server scoring engine 110. The server scoring engine 110 can be an application, script, and/or other executable data capable of determining or otherwise estimating a score for a source of notifications 112 to be received by the user.

Notifications can be generated at the server device 102 and/or provided to the server device 102, or the personal computing device 118, from a separate device and/or application. For example, data from a separate server device can cause the server device 102, the personal computing device 118, and/or the automated assistant 104 to receive or generate a notification 112. Additionally, data from other devices, such as a portable computing device 142, operated by another user 140, can also cause the server device 102, the personal computing device 118, and/or the automated assistant 104 to receive or generate a notification 112. In this way, multiple different applications from multiple different sources (e.g., persons or machines) can cause notifications 112 to be stored at any of the devices provided in the system 100.

In some implementations, the system 100 can include a vehicle apparatus 130 such as a vehicle computing device 134, which is part of a vehicle 132 and can be in communication with the personal computing device 118 and/or the server device 102. For example, the other user 140 can cause a message to be transmitted from a messaging application on their portable computing device 142 to the vehicle computing device 134 and/or the personal computing device 118. Initially, when the other user 140 sends the message over the network 116, the automated assistant 104 can be aware of the message transmission and generate a notification 112. For instance, the automated assistant 104 can be in communication with a messaging application associated with the user, and the user's messaging application can provide an indication to the automated assistant 104 regarding receipt of the message from the other user 140. Alternatively, the message transmitted from the portable computing device 142 can be transmitted by a network carrier over the network 116 to the personal computing device 118, which can include an assistant application 120 that is in communication with the automated assistant 104. The personal computing device 118 can generate a notification 122 regarding the received message and provide an indication to the automated assistant 104 at the server device 102 that a message was received from the other user 140. The personal computing device 118 can also provide a notification to the vehicle computing device 134 for presentation at a vehicle application 138, audio interface, and/or display interface of the vehicle computing device 134. However, because the presentation of notifications while driving, or performing other activities, can be distracting to the user, notifications can be limited according to certain properties of the notifications.

For example, while navigating the vehicle 132 along a route, a navigation application at the personal computing device 118 can provide audible instructions regarding various turns to take during the route navigation. A client scoring engine 124, operating at the personal computing device 118, can filter and/or score notifications or sources of notifications in order to limit an amount of distractions that the user will experience. A source of notifications can include the navigation application, which can be scored to satisfy one or more thresholds that, as a result, allow the notifications from the navigation application to be presented to the user while driving. Scoring of the navigation application can be based on the fact that the user opened the application while driving their vehicle, or that the user paired their personal computing device 118 with the vehicle computing device 134. Alternatively, the scoring of the navigation application to satisfy one or more thresholds can be based on contextual data 136, which can provide information regarding the operations of the vehicle, an environment of the vehicle, other activities the user is engaging in within the vehicle, other vehicle applications 138 that are being accessed at the vehicle 132, and/or any other information related to activities being performed by the user.

A score assigned to particular sources of notifications can be modified according to the contextual data 136. For example, a score for a navigation application can be increased when the contextual data 136 indicates that the vehicle 132 is in motion. Furthermore, scores assigned to applications unrelated to navigation can be decreased by the client scoring engine 124 as a result of the contextual data 136 indicating that the vehicle 132 is in motion and/or has reached a threshold velocity.

In some instances, notifications 122 from multiple different sources can be received at the personal computing device 118, and the client scoring engine 124 can score the sources such that only scores for less than a total number of sources satisfy a notification threshold. For example, the notifications 122 can be at least partially based on data provided by messaging applications (e.g., such as the messaging application on the portable computing device 142) and a game application. The client scoring engine 124 can score the messaging applications, and/or the sources of messages using the messaging applications, such that the scores satisfy the notification threshold. Furthermore, the client scoring engine 124 can score the gaming application such that the score for the gaming application fails to satisfy the notification threshold. As a result, the sources that have scores satisfying the notification threshold will be associated with notifications that constitute a subset of notifications. The subset of notifications can thereafter be presented to the user via an interface 126 of a computing device 128, such as the personal computing device 118, or provided to the server device 102 for further processing.

In some implementations, notification data corresponding to the subset of notifications can be provided to the automated assistant 104 and/or the server scoring engine 110 for further processing. Specifically, the server scoring engine 110 can provide a score for each source of each notification in the subset of notifications. For example, the server scoring engine 110 can access assistant interaction data 106 that can provide an indication of who the user has had conversations with while driving and who the user has declined to respond to while driving. The server scoring engine 110 can use the assistant interaction data 106 to increase a score of a source that the user has previously elected to receive messages from while driving, and decrease a score of a separate source that the user has previously declined to receive messages from while driving. Alternatively, or additionally, scores for sources can be based on a relationship of the source (e.g., spouse, family, acquaintance, co-worker, etc.). For instance, a source that corresponds to a spouse of the user can be assigned a higher score than a separate source that corresponds to a friend of the user. Alternatively, or additionally, a source that is an attendee to an event to which the user is driving to can be assigned a higher score than a separate source that is not identified as an attendee, at least according to calendar data that is accessible to the automated assistant 104.

Scores for the sources corresponding to the subset of notifications can be transmitted back to the personal computing device 118, which can compare the scores to notification thresholds stored by, or otherwise accessible to, the personal computing device 118. Messages that correspond to sources having scores satisfying the notification thresholds can thereafter be presented to the user at the personal computing device 118 and/or at the vehicle computing device 134. Other messages that correspond to sources having scores failing to satisfy the notification thresholds can be withheld from being presented to the user, at least until the scores for the sources satisfy the notification thresholds under subsequent circumstances.

In some implementations, the scores for sources can be compared to multiple different notification thresholds that are stored by, or otherwise accessible to, the personal computing device 118. For example, the scores can be compared to a complete notification threshold and, when a score satisfies the complete notification threshold, a notification corresponding to the source that was assigned the score can be presented in a full and complete form. For instance, if the notification is associated with a text message, the assistant application 120 can cause the text message to be audibly or visually presented to the user. Furthermore, in some implementations, if the score satisfies the complete notification threshold and the notification is associated with a text message, the assistant application 120 can be presented with an option to respond to the text message. In other implementations, the notification thresholds can include a partial notification threshold and, when a score satisfies the partial notification threshold, a notification corresponding to the source that was assigned the score can be partially presented to the user. For instance, if the notification is associated with an email, the assistant application 120 can cause a subject line of the email to audibly or visually presented to the user. Alternatively, if the score for the source of the email satisfies the partial notification threshold, the assistant application 120 can cause a graphic to be displayed at the personal computing device 118 and/or the vehicle computing device 134 in order to mitigate distractions while the user is driving.

In some implementations, the other user 140 can operate a portable computing device 142 that also includes an automated assistant, or is accessible to an automated assistant. When the user sends a message to the other user 140 while driving the vehicle 132, the score for the user can be set by the client scoring engine 124 and/or the server scoring engine 110. The score for the user can be set below one or more notification thresholds, at least based on contextual data 136 that indicates the user is driving the vehicle 132. Such scoring can be performed in response to selecting a preference at their portable computing device 142 in order to not receive messages from people while they are driving. In this way, the user will not receive responsive messages from the other user 140, at least until they are done driving, because the other user 140 would not have received the message from the user while the user is driving. In some implementations, the assistant application associated with the other user 140 can communicate this preference of the other user 140 to the automated assistant 104, and the automated assistant 104 can put the user on notice of the preference of the other user 140. This can further encourage the user to not text while driving, as the user will be aware that the messages they are sending while driving will not actually be received by the other user 140 until the driving user is done driving.

Figure 2:
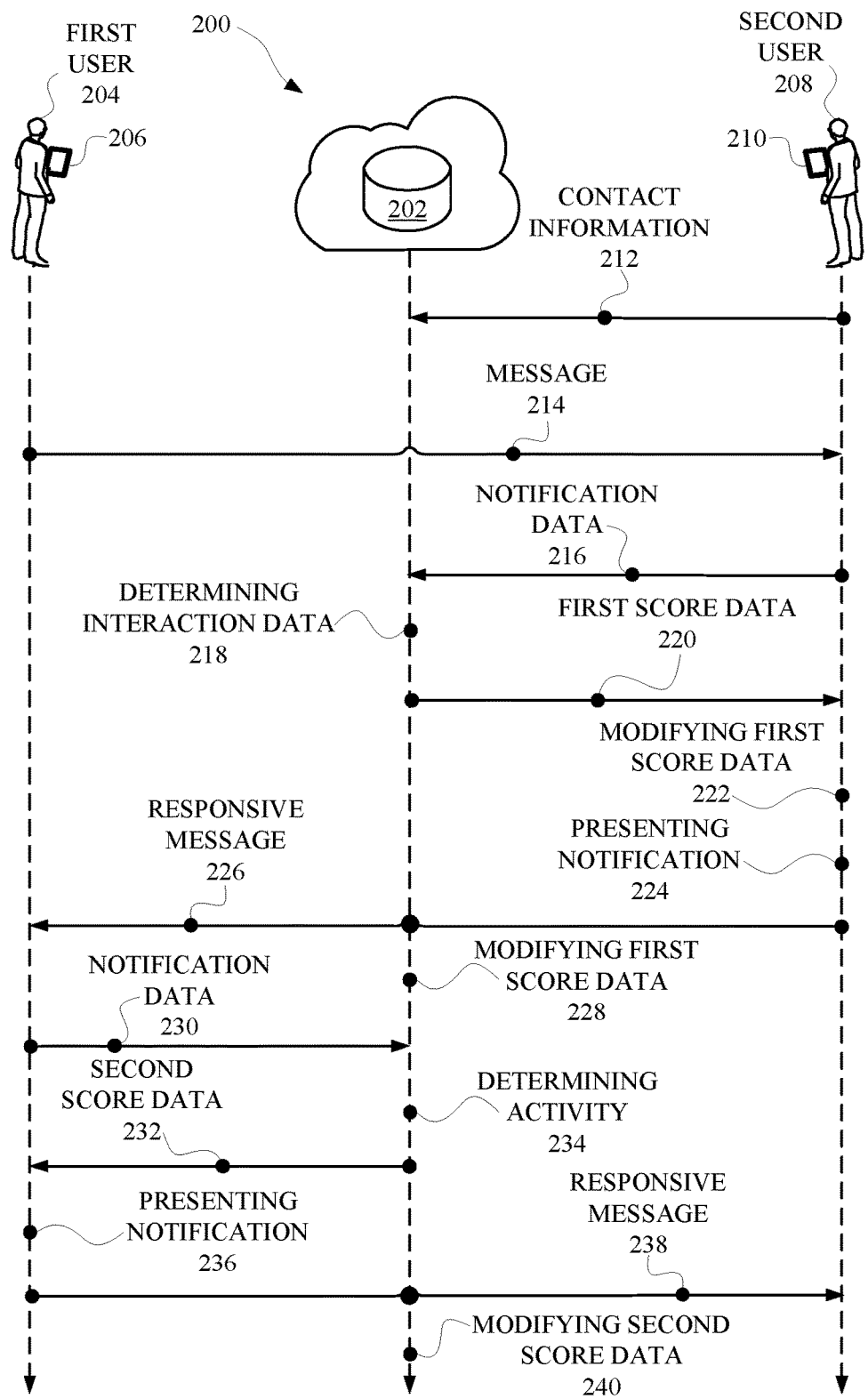
FIG. 2 includes a state diagram that illustrates how notification scores can be adapted to reduce distractions for a user.

FIG. 2 includes a state diagram 200 that illustrates how notification scores can be adapted to reduce distractions for a user. The state diagram 200 can be embodied as one or more processes executing at one or more computing devices, such as a personal computing device, a server computing device, and/or any other computing device capable of processing notifications. The state diagram 200 illustrates how a first user 204 and a second user 208 can participate in communications that cause their respective score data to change dynamically. Specifically, the score data can be adjusted in order to reduce distractions experienced by the first user 204 and/or the second user 208, at least when one of the users is participating in an activity. This can allow vital communications to be transmitted to a user, and less important communications to be delayed, omitted, or otherwise presented to the user in a less distracting format or modality.

The state diagram 200 includes a remote device 202, which can be a server device that hosts an assistant application, and/or any other application capable of processing notifications (e.g., a scoring engine). The remote device 202 can be in communications with a first computing device 206 that is operated by a first user 204, as well as a second computing device 210 that is operated by a second user 208. Each of the remote device 202, the first computing device 206, and the second computing device 210 can generate and/or modify scores, which can be used to qualify sources of data as being relevant or important enough to be a basis for providing notifications to a user. The state diagram 200 provides an example scenario of scores of sources being modified as a result of particular circumstances affecting the first user 204 and the second user 208.

The second user 208 can initially input contact information 212 into the second computing device 210. The contact information 212 can be transmitted to the remote device 202, which can score a source corresponding to the contact information 212 based on data provided in the contact information 212 and/or any other data associated with the second user 208. For example, the contact information 212 can be associated with a co-worker with whom the second user 208 has previously corresponded with over electronic communications. The second user 210 can add the contact information 212 into the second computing device 210, and the remote device 202, after being introduced to the co-worker. Thereafter, as provided in state diagram 200, the first user 204, which can be the co-worker, can send a message 214 to the second user 208.

The message 214 can be received by the second computing device 210 and/or the remote device 202. However, depending on the circumstances in which the second user 208 receives the message 214, the second user 208 may not be notified of the message 214 until a score corresponding to the first user 204 has satisfied a notification threshold. In some implementations, the second computing device 210 can generate score data associated with the first user 204. In other implementations, the message 214 can initially be received at the second computing device 210, and the second computing device 210 can provide notification data 216 to the remote device 202.

The notification data 216 can be processed by the remote device 202 in order that the remote device 202 can identify the source of the message 214, and/or any other data related to a context of the message. For example, the remote device 202 can process the notification data 216 for determining interaction data 218. The interaction data 218 can identify or describe previous instances where the first user 204 and the second user 208 interacted or otherwise communicated. The interaction data 218 can also identify other data that is associated with the first user 204, such as calendar data, location data, social network data, message data, phone call data, purchase data, and/or any other data that can be associated with a source of information. The notification data 216 can be used as a basis for the remote device 202 to generate first score data 220, which can be transmitted from the remote device 202 to the first computing device to 10. The first computing device 206 can perform a process of modifying the first score data 222. The modified first score data 222 can be based on the first score data 222 and/or any other information available to the first computing device 206. For example, the first computing device 206 can be aware of one or more applications that the second user 208 is accessing, and the first score data can be modified according to the types of applications the second user 208 is using.

The modified first score data 222 can be compared to one or more notification thresholds in order to determine whether to present the notification about the message 214 to the second user 208. If the modified for score data 222 satisfies a notification threshold, a notification regarding the message 214 can be presented (i.e., presenting notification 224) at the second computing device 210 and/or a separate computing device that is associated with the second user 208. If the modified first score data 222 does not satisfy the notification threshold, the notification can be provided at another time, in a different format, in a different modality, or omitted completely.

If the second user 208 receives a notification regarding the message 214, the second user 208 can send a responsive message 226 to the first user 204. Specifically, the second user 208 can direct an automated assistant to provide the responsive message 226 to the first user 204. When the automated assistant is hosted at the remote device 202, the remote device 202 will have a record of the second user 208 responding to the first user 204. If the second user 208 was performing an activity when the responsive message 226 was sent, the automated assistant can perform a process of modifying the first score data 228. Specifically, the automated assistant can modify the first score data 228 to reflect the willingness of the second user 208 to communicate with the first user 204 during the activity. For example, the first score can be increased such that when the second user 208 is involved in the activity and receives a message from the first user 204, the first computing device 210 can present the message to the first user 204, at least based on how high the first score is.

In response to receiving the responsive message 226, the first computing device 206 can provide notification data 230 to the remote device 202. The remote device 202 can perform a process of determining an activity 234 of the second user 208. The remote device 202 can process the notification data 230 along with any data related to the activity being performed by the second user 208 in order to provide second score data 232. In some implementations, the second score data 232 can be based on a relationship between the first user 204 and the second user 208. In other implementations, the second score data 232 can be based on preferences of the second user 208 along with data identifying the content of the responsive message 226, and/or any other data related to the second user 208.

When second score data 232 satisfies a notification threshold associated with the first user 204, the first computing device 206 can perform a process of presenting the notification 236. The first user 204 can then provide a responsive message 238 to the second user 208. The remote device 202 can acknowledge the responsive message 238 and perform a process of modifying the second score data 240. By modifying second score data 240, the second score data 240 can reflect the willingness of the first user 204 to communicate with the second user 208, in view of the second user participating in an activity, having a particular relationship with the first user 204, and/or any other circumstance or information related to the second user 208 and the first user 204.

Figure 3:
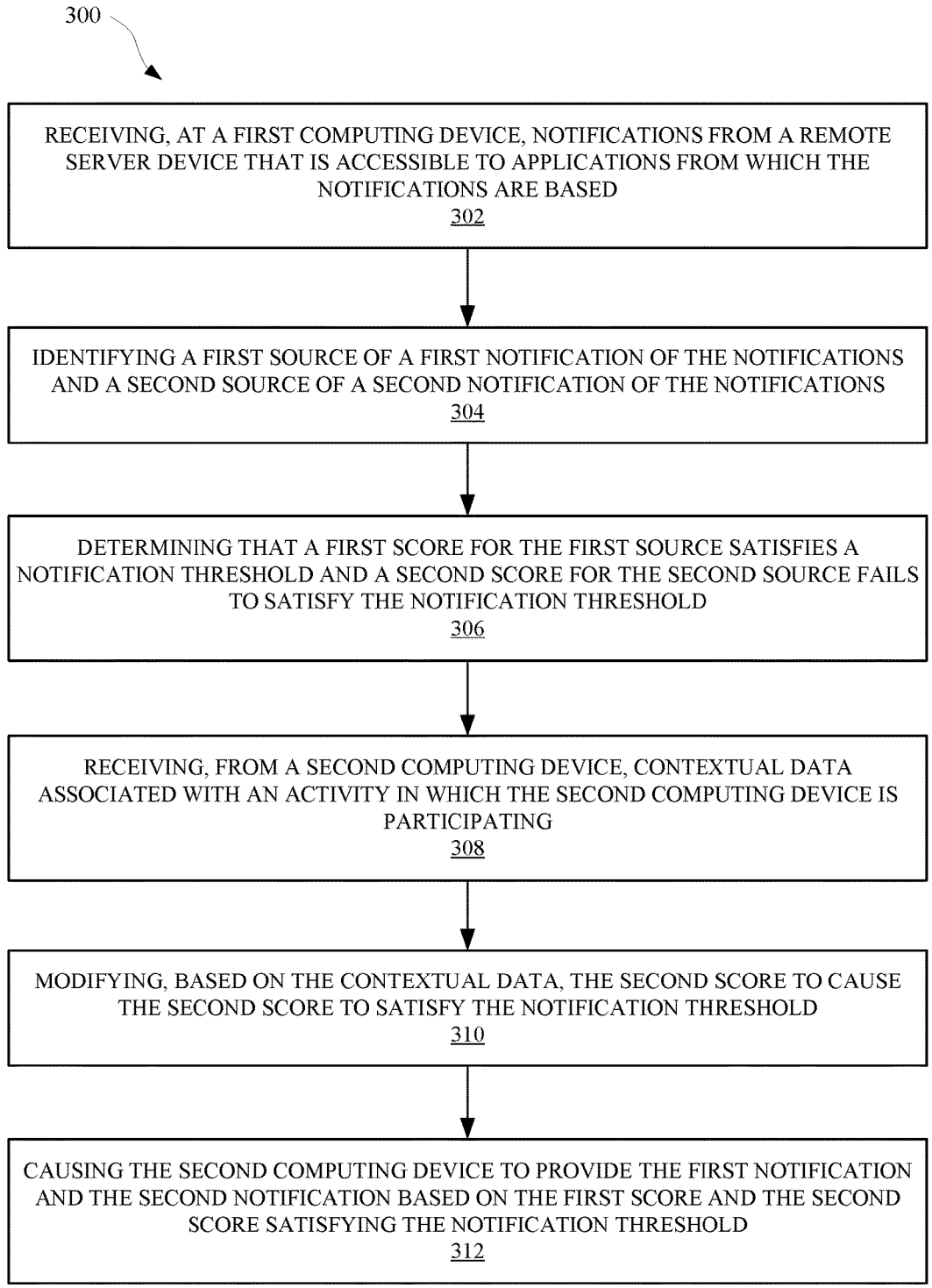
FIG. 3 illustrates a method for limiting notifications provided to a user according to scores that are assigned to sources of the notifications.

FIG. 3 illustrates a method 300 for limiting notifications provided to a user according to scores that are assigned to sources of the notifications. The method 300 can be performed by one or more computing devices, and/or any other apparatus capable of processing notifications to be received by a person or machine. The method 300 can include an operation 302 of receiving, at a first computing device, notifications from a remote server device that is accessible to applications from which the notifications are based. The first computing device can be, for example, a cellular phone that includes an automated assistant interface for interacting with an automated assistant application via the automated assistant interface. Furthermore, the applications accessible to the remote server device can be messaging applications, gaming applications, media applications, network applications, fitness applications, navigation applications, and/or any other applications that can operate at a computing device.

The method 300 can further include an operation 304 of identifying a first source of a first notification of the notifications and a second source of a second notification of the notifications. The first source and the second source can correspond to separate entities that each control an application of the applications. For example, the first source can correspond to a person that is a spouse of the user, as indicated by a contact list that is accessible to the first computing device. The second source can correspond to a co-worker of the user. In some implementations, the first source and the second source can each be associated with separate servers that communicate data, associated with the notifications, to the remote server device.

Additionally, the method 300 can include an operation 306 of determining that a first score for the first source satisfies a notification threshold and a second score for the second sources fails to satisfy the notification threshold. The notification threshold can be stored by, or otherwise accessible to, the first computing device. The notification threshold can be associated with how a notification will be provided to the user. Furthermore, the notification threshold can be one of multiple different notification thresholds that can be used to filter notifications according to their corresponding scores or the scores of their corresponding sources. For instance, the notification threshold of operation 306 can be provided to initially filter sources according to who they are or what applications they are associated with. Scores of the sources that satisfy the notification threshold can thereafter be updated based on other criteria, such as, for example, interaction data, contextual data, and/or any other information that can be associated with the sources.

Furthermore, the method 300 can include an operation 308 of receiving, from a second computing device, contextual data associated with an activity in which the second computing device is participating. The second computing device can be a vehicle computing device that collects data related to the operation of the vehicle, and any other information related to the context in which the vehicle is being operated. For example, the contextual data can include vehicle speed, route data, weather data, vehicle maintenance data, passenger data, and/or any other data that can be derived from a context of a computing device. In some implementations, the contextual data can be based on signals from one or more sensors on the vehicle, or one or more remote devices that are in communication with the vehicle computing device. For instance, the contextual data can correspond to route data that is provided by a navigation application operating at the vehicle computing device. The route data can identify the destination for the route as being a work meeting location associated with the second source (e.g., a co-worker). In this way, the contextual data can be compared to the sources having scores that have previously satisfied the notification threshold, to determine how to further adjust the scores.

The method 300 can include an operation 310 of modifying, based on the contextual data, the second score to cause the second score to satisfy the notification threshold. For example, the second source can be a co-worker and the destination identified by the contextual data can be a location for a work meeting or other work-related location. The score for the second source can therefore be adjusted based on the relevance of the second source to the contextual data. In this way, scores for sources can change dynamically as the context of the notifications change. In some implementations, the second score can be modified such that the second score temporarily satisfies the notification threshold. For instance, when the contextual data indicates that the user has arrived at the destination, or subsequently left the destination after arriving, the second score can be again modified to not satisfy the notification threshold.

The method 300 can further include an operation 312 of causing or controlling the second computing device to provide the first notification and the second notification based on the first score and the second score satisfying the notification threshold. In some implementations, causing the second computing device to provide the first notification and the second notification can include causing a display device connected to the second computing device of a vehicle to display graphics and/or text corresponding to the first notification and the second notification.

Figure 4:
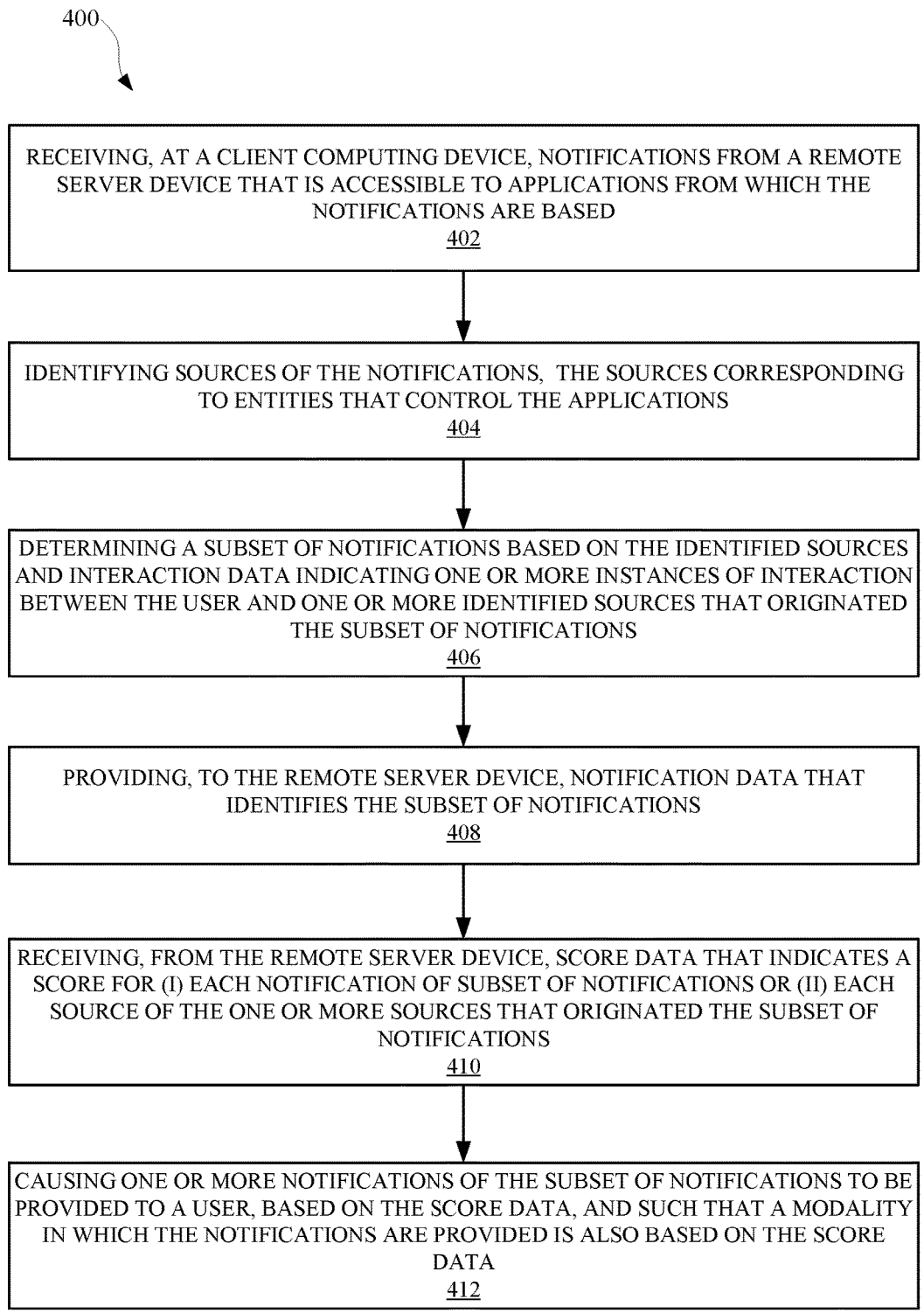
FIG. 4 illustrates a method for limiting notifications to a subset of notifications based on score data that is at least partially generated at a remote device.

FIG. 4 illustrates a method 400 for limiting notifications to a subset of notifications based on score data that is at least partially generated at a remote device. The method 400 can be performed by one or more computing devices, and/or any other apparatus capable of processing notifications to be received by a person or machine. The method 400 can include an operation 402 of receiving, at a client device, notifications from a remote server device that is accessible to applications from which the notifications are based. The notifications can be from multiple different applications, web services, automated assistants, third party agents, and/or any other program capable of providing data to a device.

The method 400 can further include an operation 404 of identifying sources of the notifications. The sources can correspond to entities that control the applications. For example, the applications can includes messaging applications and a third party agent application. Therefore, sources that control the messaging applications and the third party agent application can be one or more persons, devices, and/or any other entity capable of controlling an application or device. The sources can be identified using data that is included, or otherwise associated, with the received notifications. For example, the data can include headers or other strings text that can be compared with a lookup table for determining the names of the sources of the notifications. In some implementations, the lookup table can include or be associated with a list of scores for the sources. The scores can include dynamic scores that change over time as the user interacts with the sources, and/or as context of the user and/or the sources changes over time.

The method 400 can further include an operation 406 of determining a subset of notifications based on the identified sources and/or interaction data that indicates one or more instances of interaction between the user and one or more identified sources that originated the subset of notifications. For example, the subset of notifications can be limited to notifications that were provided by sources corresponding to messaging applications. Furthermore, in some implementations, the subset of notifications can be limited to notifications that were provided by sources corresponding to persons that the user frequently engages with via a messaging application. Determinations regarding who the user frequently engages with can be based on assistant interaction data that tracks how often a user engages an assistant application to contact a source, how recently a user contacted a source, other application data that identifies the source, and/or any other information that can be used to determine how willing a user may be to receiving notifications from a source. In some implementations, determining the subset of notifications can be based on an identity of the identified sources and be independent of the content of the notifications.

The method 400 can also include an operation 408 of providing, to the remote server device, notification data that identifies the subset of notifications. The notification data can identify sources of the subset of notifications and/or any other data associated with the subset of notifications. For example, when the subset of notifications include notifications related to messages from one or more sources, the notification data can include content from the messages, other recipients of the message, subject lines in the messages, time of receipt and/or sending of the messages, and/or any other data that can be associated with a message.

The method 400 can further include an operation 410 of receiving, from the remote server device, score data that indicates a score for (i) each notification of subset of notifications or (ii) each source of the one or more sources that originated the subset of notifications. The score data can represent a relevance of each notification to the user and/or a current context of the user. For example, a first source for a first notification of the subset of notifications can correspond to a spouse of the user, while a second source for a second notification of the subset of notifications can correspond to an acquaintance with which the user rarely communicates. Therefore, the first source can be scored higher than the second score, at least based on their relationships to the user, as indicated by data that is available to the remote server device. It should be noted that the client device can initially determine the subset of notifications from the received notifications independent of content (e.g., natural language message content) of the notifications. In other words, the client device can initially filter notifications to generate the subset of notifications based on the sources and/or scores for the sources. Meanwhile, the remote server device can determine the score data based on the content of the notifications. In this way, computational resources can be conserved at the client device, while more extensive processing (e.g., processing of natural language content) can be left to the remote server device.

Additionally, the method 400 can include an operation 412 of causing one or more notifications of the subset of notifications to be provided to a user based on the score data. In some implementations, a modality in which the notifications are provided can also be based on the score data, or otherwise identified in provisioning data received from the remote server device. For example, because the first source (e.g., the spouse) has been assigned a higher score than the second source (e.g., the acquaintance), first notification can be presented to the user differently than the second notification. The first notification can, for instance, be presented through both an audio and video modalities, and the second notification can be presented through a video modality. In this way, distractions for the user will be mitigated, as only notifications will be filtered according to an importance or relevance of the source of the notification to the user. Furthermore, the remote server device can provide provisioning data that also details the content of the notifications to be presented to the user. For example, the remote server device can provide provisioning data that details text to be displayed for the user and/or audio to be dictated to the user in order to elicit a response from the user.

Figure 5:
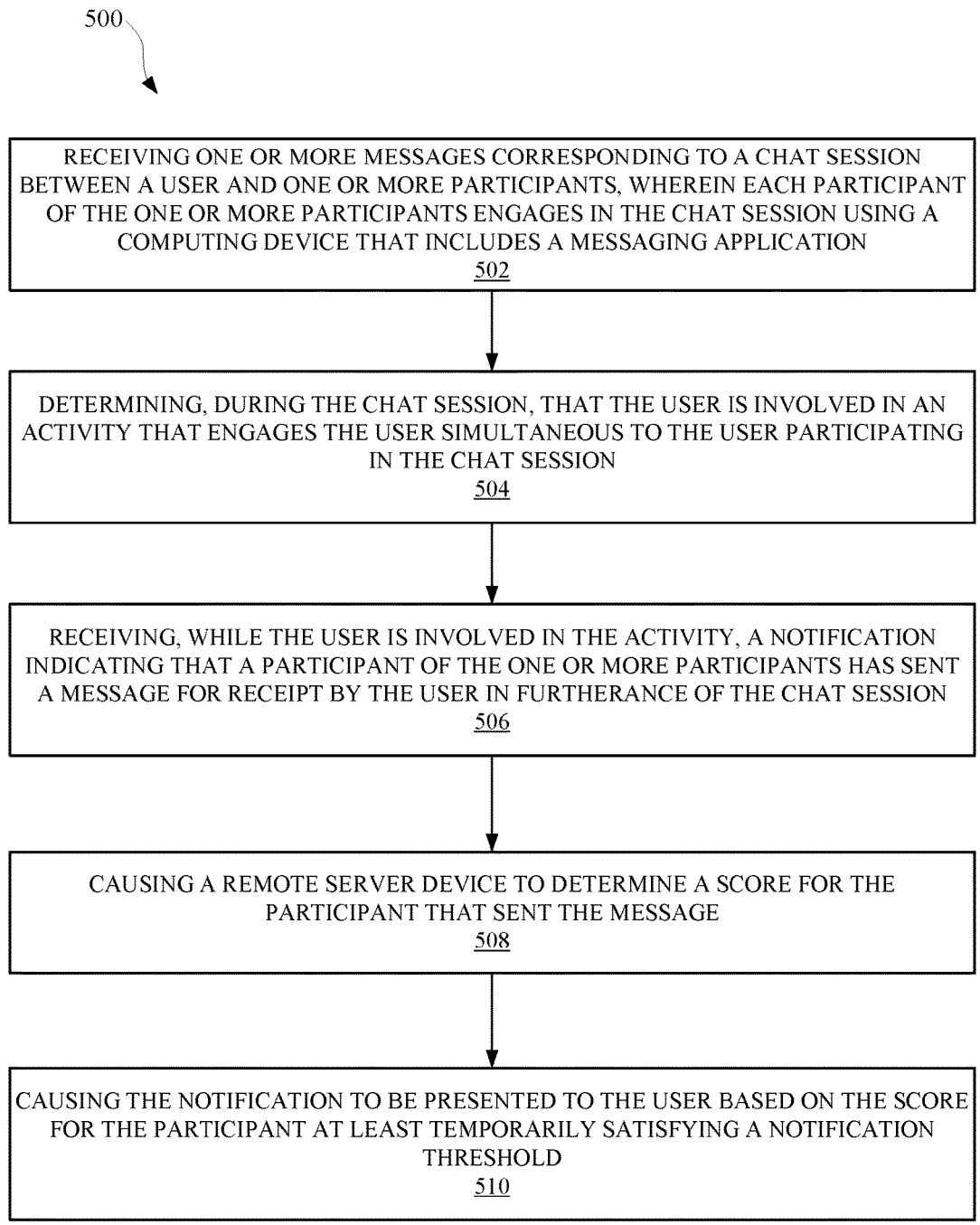
FIG. 5 illustrates a method for dynamically modifying scores for sources of notifications at least according to one or more activities that a user is participating in to reduce distractions experienced by the user.

FIG. 5 illustrates a method 500 for dynamically modifying scores for sources of notifications at least according to one or more activities that a user is participating in to reduce distractions experienced by the user. The method 500 can be performed by one or more computing devices, and/or any other apparatus capable of processing notifications to be received by a person or a machine. The method 500 can include an operation 502 of receiving one or more messages corresponding to a chat session between a user and one or more participants. Each participant of the one or more participants can engage in the chat session using a computing device that includes a messaging application. Furthermore, each messaging application operated by the participants can be in communication either directly or indirectly with an automated assistant that is accessible to the user. In this way, the automated assistant can be privy to communications occurring between the user and the participants.

The method 500 can also include an operation 504 of determining, during the chat session, that the user is involved in an activity that engages the user differently than participating in the chat session. The activity can include one or more activities such as, for example, driving a vehicle. Alternatively, the activity can be participating in an audio or video call, walking on stairs, swimming, recording audio or video, working outside of a home of the user, playing a game, and/or any other activity that requires some amount of cognition from the user. The activity (e.g., driving) can be identified, and interaction data associated with the activity can be used to determine an amount of engagement that the user typically exhibits when involved in the activity. For example, if the user has typically declined to receive video calls during the activity, the automated assistant or other application can determine that the activity at least partially visually engages the user. Therefore, any scoring of sources of notifications received during the activity can be based on the activity, and, specifically, on how the user is engaging in the activity.

The method 500 can include an operation 506 of receiving, while the user is involved in the activity, a notification indicating that a participant of the one or more participants has sent a message for receipt by the user in furtherance of the chat session. In other words, the chat session has continued into a time after the user was initially involved in the activity. For example, when the activity is driving, the notification would be received while the user is driving their vehicle.

The method 500 can include an operation 508 of causing a remote server device to determine a score for the participant that sent the message. The score can be generated using at least interaction data that identifies instances of interaction between the participant and the user while the user is involved in the activity, or at any other time when the user interacted with the participant. Alternatively, or additionally, the interaction data can indicate information that correlates the participant to the activity in which the user is involved. For example, the activity can be driving, and the participant can be identified in the interaction data as someone the user has previously communicated with while driving. Alternatively, or additionally, the interaction data can indicate an amount of time since the user has communicated with the user. If the amount of time satisfies a communication threshold, the score can be increased or otherwise generated to cause the notification from the participant to be presented to the user during the activity. However, if the amount of time does not satisfy the communication threshold, the score can be decreased or otherwise generated to cause the notification from the participant to be presented in a partial format (e.g., only a portion of the corresponding messaging), or delayed until the user is no longer involved in the activity.

The method 500 can further include an operation 510 of causing the notification to be presented to the user based on the score for the participant at least temporarily satisfying a notification threshold. For example, a personal computing device of the user can cause or control a vehicle computing device of the user to present the notification via an audio-visual interface of the vehicle computing device. Alternatively, the personal computing device can present the notification to the user in a complete or partial format, depending on the notification threshold that has been satisfied by the score.

Figure 6:
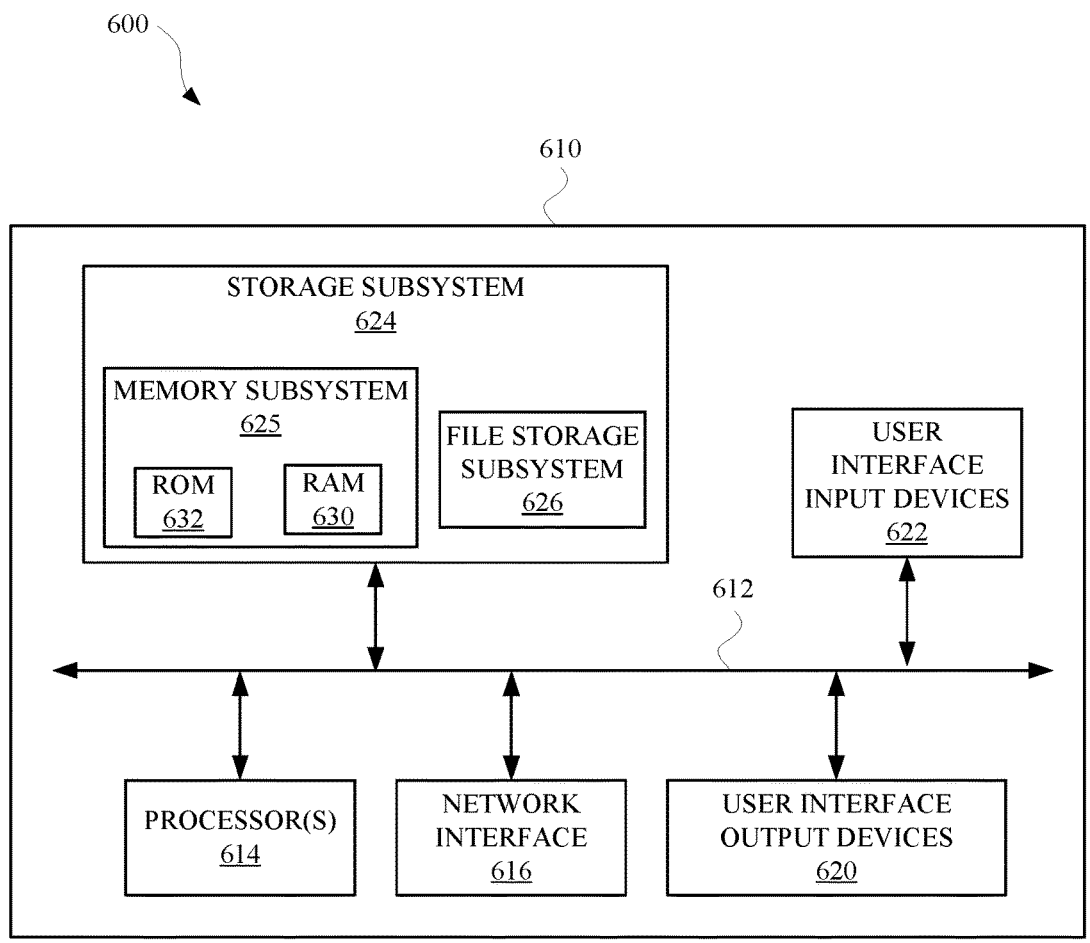
FIG. 6 is a block diagram of an example computer system.

FIG. 6 is a block diagram 600 of an example computer system 610. Computer system 610 typically includes at least one processor 614 which communicates with a number of peripheral devices via bus subsystem 612. These peripheral devices may include a storage subsystem 624, including, for example, a memory 625 and a file storage subsystem 626, user interface output devices 620, user interface input devices 622, and a network interface subsystem 616. The input and output devices allow user interaction with computer system 610. Network interface subsystem 616 provides an interface to outside networks and is coupled to corresponding interface devices in other computer systems.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 610 to the user or to another machine or computer system.

Storage subsystem 624 stores programming and data constructs that provide the functionality of some or all of the modules described herein. For example, the storage subsystem 1124 may include the logic to perform selected aspects of method 300, method 400, method 500, and/or to implement one or more of remote device 114, server device 102, automated assistant 104, personal computing device 118, vehicle computing device 134, remote device 202, first computing device 206, second computing device 210, and/or any other device capable of performing any operations discussed herein.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 624, or in other machines accessible by the processor(s) 614.

Bus subsystem 612 provides a mechanism for letting the various components and subsystems of computer system 610 communicate with each other as intended. Although bus subsystem 612 is shown schematically as a single bus, alternative implementations of the bus subsystem may use multiple busses.

Computer system 610 can be of varying types including a workstation, server, computing cluster, blade server, server farm, or any other data processing system or computing device. Due to the ever-changing nature of computers and networks, the description of computer system 610 depicted in FIG. 6 is intended only as a specific example for purposes of illustrating some implementations. Many other configurations of computer system 610 are possible having more or fewer components than the computer system depicted in FIG. 6.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

We claim:

1. A method implemented by one or more processors, the method comprising:
receiving, at a first computing device, notifications from a remote server device that is accessible to applications from which the notifications are based;
identifying a first source of a first notification of the notifications and a second source of a second notification of the notifications, wherein the first source corresponds to a first entity that controls a first application of the applications and the second source corresponds to a second entity that controls a second application of the applications;
determining that a first score for the first source satisfies a notification threshold and a second score for the second source fails to satisfy the notification threshold, wherein the first score is based on first previous instances of interaction between a user of the first computing device and the first source, and wherein the second score is based on second previous instances of interaction between the user and the second source;
receiving, from a vehicle computing device that is integrated into a vehicle and includes a navigation application, contextual data that is based on one or more properties of an activity of navigating the vehicle through a route that is dictated via an audio interface of the vehicle computing device,
wherein the vehicle computing device is configured to provide certain notifications according to scores of sources associated with the notifications, and
wherein the one or more properties, upon which the contextual data is based, identify how the vehicle is navigating;
modifying the second score based on the contextual data;
determining that the modified second score satisfies the notification threshold; and
causing the vehicle computing device to provide the first notification and the second notification based on the first score and the modified second score satisfying the notification threshold.

2. The method of claim 1, wherein modifying the second score based on the activity further causes the second score to temporarily satisfy the notification threshold until the vehicle computing device ceases participating in the activity.

3. The method of claim 1, wherein the notification threshold is associated with a particular modality through which the first notification and the second notification are provided, the particular modality comprising one or both of: an audio modality and a visual modality.

4. A method implemented by one or more processors, the method comprising:
receiving, at a client computing device of a user during performance of an activity by the user, a notification, wherein the activity includes navigating a vehicle through a route that is being dictated via an audio interface of a vehicle computing device, and
wherein the vehicle computing device is integrated into the vehicle and includes a navigation application, and identifying, at the client computing device, a source of the notification;
determining, at the client computing device and based on the source of the notification, that the notification is a candidate for providing to the user during the performance of the activity;
in response to determining that the notification is a candidate for providing to the user during the performance of the activity:
transmitting, by the client computing device to a remote server device, notification data that is based on the notification;
receiving, from the remote server device in response to the transmitting, provisioning data that indicates whether to provide the notification; and
causing, by the client computing device and based on the provisioning data, notification content, that is based on the notification, to be provided to the user during the activity,
wherein the remote server device generates the provisioning data based on one or more properties that identify how the vehicle is navigating, and
wherein causing the notification content to be provided comprises causing the notification content to be provided via at least one device of:
the client computing device and the vehicle computing device.

5. The method of claim 4, further comprising:
receiving, at the client computing device during performance of the activity, an additional notification;
identifying, at the client computing device, an additional source of the additional notification;
determining, at the client computing device and based on the additional source of the additional notification, that the additional notification is not a candidate for providing to the user during the activity;
based on determining that the notification is not a candidate for providing to the user:
suppressing transmission of additional notification data to the remote server device, wherein the additional notification data is based on the additional notification; and
suppressing provision of the additional notification during the activity.

6. The method of claim 4, wherein transmitting the notification data to the remote server device is further based on determining, at the client computing device, that the user is engaged in the activity.

7. The method of claim 4, wherein the provisioning data received from the remote server device, in response to the transmitting, further indicates a particular modality via which to provide the notification, and wherein causing the notification content to be provided further comprises:
causing the notification content to be provided via the particular modality based on the provisioning data indicating the particular modality.

8. The method of claim 7, wherein the particular modality is one of: an audio only modality, a graphical only modality, and a combined audio and graphical modality.

9. The method of claim 7, wherein the particular modality indicates whether the notification content is to be provided via the client computing device only, the vehicle computing device only, or both the client computing device and the vehicle computing device.

10. The method of claim 4, wherein causing the notification content to be provided comprises:
controlling, by the client computing device, the vehicle computing device to cause the vehicle computing device to provide the notification content.

11. The method of claim 4,
wherein the notification is a message that includes natural language content formulated by the source;
wherein determining, at the client computing device, that the notification is a candidate for providing to the user is based on the source of the notification and is independent of the natural language content; and
wherein the provisioning data is determined at the remote server device based on the natural language content.

12. The method of claim 4, wherein the notification content comprises a subset of the notification or a rewrite of the notification, and wherein the provisioning data received from the remote server device further comprises the notification content.

13. The method of claim 4, wherein the provisioning data comprises a score for the notification, and wherein causing the notification data to be provided based on the provisioning data comprises causing the notification data to be provided based on the score satisfying a threshold.

14. A method implemented by one or more processors, the method comprising:
receiving one or more pre-activity messages in a messaging session between participantsherein that include a user and one or more additional users,
wherein each of the participants engages in the messaging session using a corresponding messaging application of a corresponding computing device,
wherein the one or more pre-activity messages are received prior to the user engaging in a particular activity that includes navigating a vehicle through a route that is being dictated via an audio interface of a vehicle computing device, and
wherein the vehicle computing device is integrated into the vehicle and includes a navigation application;
determining, after receiving the one or more pre-activity messages, that the user is engaged in the particular activity;
in response to determining that the user is engaged in the particular activity:
activating a modified notification mode that selectively suppresses provisioning of electronic notifications to the user;
receiving, while the user is engaged in the particular activity and while the modified notification mode is activated, an additional message provided in the messaging session by one of the one or more additional users;
determining a score for the additional message based on at least one of: recency of the one or more pre-activity messages, a quantity of the one or more pre-activity messages, and one or more properties that identify how the vehicle is navigating; and
causing, based on the score, content that is based on the additional message to be rendered via at least one computing device of the user.

15. The method of claim 14, wherein causing, based on the score, the content to be rendered via the at least one computing device comprises:
determining, based on the score, to provide the content in lieu of suppressing the content.

16. The method of claim 14, wherein causing, based on the score, the content to be rendered via the at least one computing device comprises: selecting the vehicle computing device, or a modality for rendering of the content, based on the score.

17. The method of claim 14, further comprising:
receiving, while the user is engaged in the particular activity and while the modified notification mode is activated, an additional notification that is not part of the messaging session;
determining an additional score for the additional notification based on a source of the additional notification; and
suppressing, based on the additional score, provision to the user of any additional content that is based on the additional notification.

18. The method of claim 14, wherein causing, based on the score, the content that is based on the additional message to be rendered via the at least one computing device of the user comprises causing the content to be audibly rendered, and further comprising:
receiving, while the user is engaged in the particular activity and while the modified notification mode is activated, an additional notification that is not part of the messaging session;
determining an additional score for the additional notification based on a source of the additional notification; and
causing, based on the additional score, additional content that is based on the additional notification to be graphically rendered via the at least one computing device, without being simultaneously audibly rendered.

* * * * *